INVENTORS
CHARLES E. MILLER
ROBERT B. JACOBS

United States Patent Office 3,298,221
Patented Jan. 17, 1967

3,298,221
DENSITOMETER
Charles E. Miller and Robert B. Jacobs, Boulder, Colo., assignors to the United States of America as represented by the Administrator of the National Aeronautics and Space Administration
Filed Dec. 30, 1963, Ser. No. 334,672
4 Claims. (Cl. 73—32)

The invention described herein may be manufactured and used by or for the Government of the United States of America for governmental purposes without the payment of any royalties thereon or therefor.

This invention relates to mass fluid flow measurement and, more particularly, to an improved apparatus for measuring the density of both single and two-phase flowing fluids. The invention is particularly concerned with an improved electromechanical densitometer for measuring the densities of flowing cryogenic fluids.

Mass flow measurement has become increasingly important in the operation and testing of rocket engines utilizing cryogenic fuels and oxidizers because the changes in density occurring during fluid transfer make volume flow measurement unsatisfactory. Mass flow rate is frequently determined by an inferential method wherein a product of density and volume flow rates is obtained. A problem arising with this method has been the lack of a satisfactory technique for measuring the density of a flowing fluid.

Various devices have been proposed which vibrate the flowing fluid at its natural frequency of vibration and relate this frequency to density. However, because of their high operating frequencies and low amplitudes, these devices have not been satisfactory for measuring two-phase flow.

This problem has been solved by the electromechanical method and apparatus of the present invention which utilizes a section of flow passage as a sensing element that is vibrated transversely at a constant amplitude and frequency. A dynamometer which connects the flow passage to a driving oscillator continuously measures the acceleration reaction of the fluid in the passage. This acceleration reaction is a product of mass and acceleration, and a measure of this reaction is also a measure of the fluid density in the passage.

It is an object of the invention to provide an accurate apparatus for measuring the density of a flowing fluid wherein actual flow is measured instead of a sample whose accuracy is doubtful.

Other objects and advantages of the invention will be apparent from the specification which follows and from the drawings wherein like numerals are used throughout to identify like parts.

Figure 1:
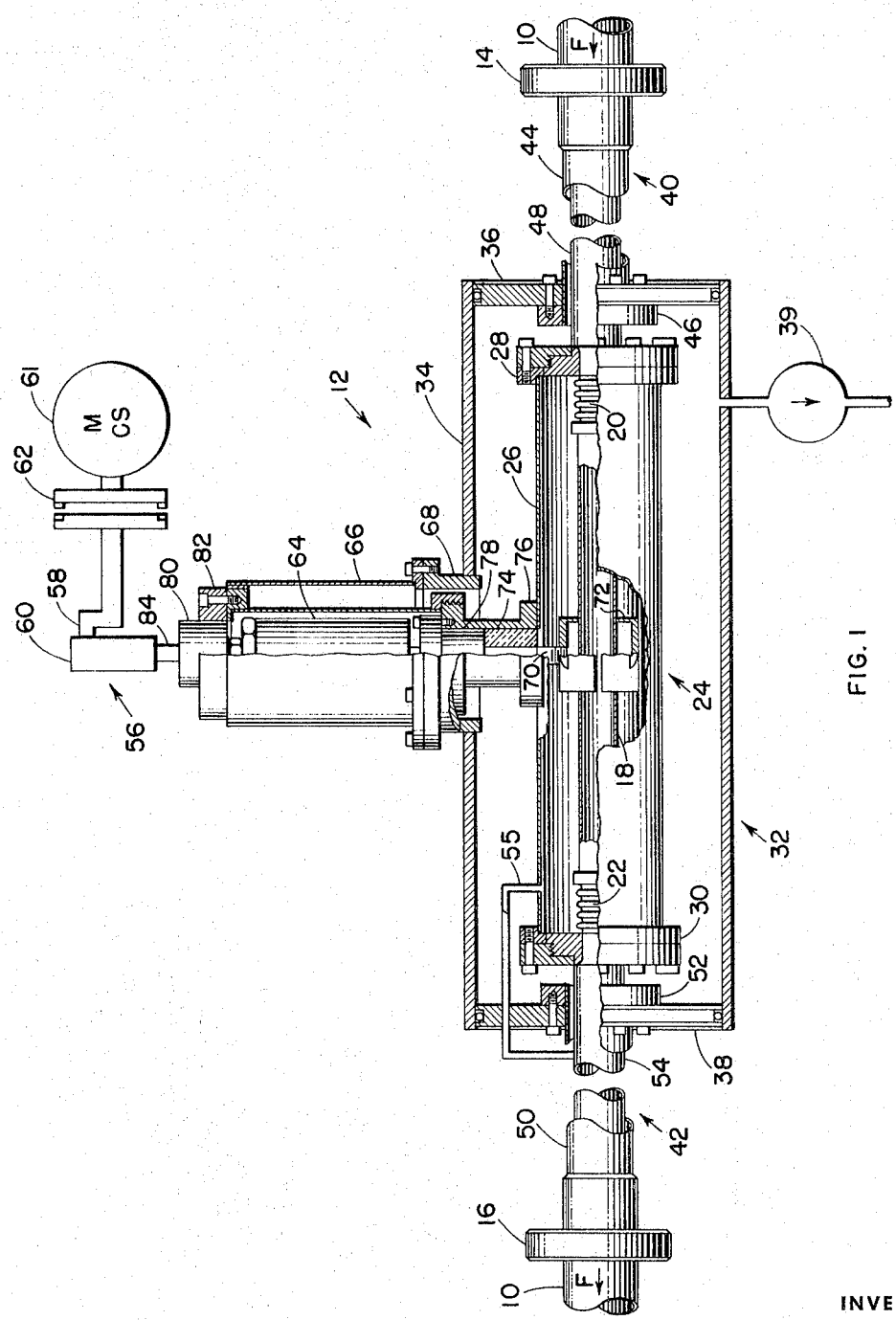
FIG. 1 is a vertical sectional view of a density determining apparatus constructed in accordance with the present invention.

Referring now to the drawings, there is shown in FIG. 1 an apparatus constructed in accordance with the invention for determining the density of a pressurized fluid flowing in a pipe 10 or the like in the direction of the arrows F. This apparatus, which performs the method of the invention, comprises a densitometer 12 that is operatively connected to the pipe 10 by a pair of spaced couplings 14 and 16.

The densitometer 12 includes a movable conduit 18 having a pair of bellows 20 and 22 mounted on its opposite ends. The conduit 18 which is preferably a length of substantially rigid tubing is enclosed within a pressure housing 24 which comprises a tubular wall 26 with opposed end walls 28 and 30 adjacent the bellows 20 and 22 respectively. The pressure housing 24 is utilized to equalize the pressures on the inside and outside of the conduit 18 so that this tubing can be extremely thinwalled. In this manner the portion of the total vibrated mass attributed to the conduit is kept to a minimum.

The pressure housing 24 is mounted in a vacuum jacket 32 which includes a tubular side wall 34 having its opposed ends covered by plates 36 and 38 spaced from the pressure housing end walls 28 and 30 respectively. The vacuum jacket 32 is evacuated by a suitable vacuum pump 39. The pressure housing 24 along with the conduit 18 is thermally insulated from the ambient surroundings by the vacuum jacket 32 when a cryogenic fluid is flowing in the pipe 10.

A pair of rigid transfer lines 40 and 42 extend from the couplings 14 and 16 respectively to the end plates 36 and 38 respectively. The line 40 comprises a rigid outer casing 44 which extends through the end plate 36 and is rigidly secured thereto concentrically with the tubular side wall 34 by a circular mounting plate 46. The fluid line 40 further includes a rigid inner casing 48 concentric with the outer casing 44 that extends through the plate 36 to the end wall 28 of the pressure housing 24 and is rigidly secured thereto. The transfer line 42 similarly comprises a rigid outer casing 50 that is secured to the end plate 38 by a plate 52 and a rigid inner casing 54 that is rigidly secured to the end wall 30 of the pressure housing 24.

The inner casings 48 and 54 are spaced inwardly from the outer casings 44 and 50, and these relative positions are maintained by the couplings 14 and 16 respectively. The spaces between these inner and outer casings communicate with the interior of the vacuum jacket 32 through the plates 46 and 52 which also maintain the transfer lines 40 and 42 respectively concentric with the vacuum jacket 32. In this manner cryogenic fluid in the inner casing 48 and 54 is thermally insulated. The rigid inner casings 48 and 54 likewise maintain the pressure housing 24 concentric with the vacuum jacket 32. It will be appreciated that if the fluid in the line 10 and tubing 18 need not be thermally insulated, the vacuum chamber 32 can be removed and single walled casings may be substituted for the transfer lines 40 and 42.

The outboard end of the bellows 20 and 22 are rigidly secured to the end walls 28 and 30 respectively of the pressure housing 24. These bellows provide the necessary flexibility for the movable conduit 18, and single-ply beryllium copper has been found to be satisfactory for this purpose. Because of the pressure sensitivity of the bellows 20 and 22, the interior of the inner casing 54 is connected to the interior of the pressure housing 24 through a pressure equalizing tube 55. This arrangement removes any pressure differential across the bellow walls thereby eliminating any pressure sensitivity.

As an alternate embodiment it is contemplated that sliding seals may be used between the ends of the conduit 18 and the mating ends of the transfer lines 40 and 42. In this embodiment the bellows 20 and 22 are not used and the pressure housing 26 is eliminated. In order to maintain an equivalent dynamic system a retarding spring is utilized with the sliding seals.

A mechanical oscillator 56 located directly above the densitometer 12 generates a sinusoidal motion in the tubing 18 of controlled amplitude and frequency. The oscillator 56 is preferably in the form of a Scotch yoke mechanism comprising a crank 58 with a slotted cross head 60 at right angles to the direction of rectilinear motion. Uniform rotation of the crank 58 produces a harmonic motion in the cross head 60, and this rotation is produced by a synchronous motor 61 operably connected to the oscillator 56 by a clutch 62 that is preferably of the overload type to protect various parts of the apparatus in case of any malfunctioning.

A strain gage type dynamometer 64 which operates on the unbounded strain gage principle is enclosed in a housing 66 mounted on a bracket 68, and this dynamometer is in the vertical plane between the oscillator 56 and the conduit 18. To minimize heat conduction, the dynamometer 64 is operably connected to the flow passage 18 by a small diameter rod 70 of stainless steel or the like which extends through the wall 34 along the axis of the circular bracket 68 and is attached to the cold surface of the tube 18 by a suitable clamp 72. A cylinder 74 of insulating material is carried by a sleeve 76 mounted below the dynamometer 64 between the vacuum jacket 32 and the pressure housing 24, and the rod 70 extends through the cylinder 74 to reduce convection currents in the housing 66.

A ball bearing spline assembly 78 is mounted in the sleeve 76 immediately below the dynamometer 64 adjacent the cylinder 74. The assembly 78 is utilized to restrict the motion of the flow passage 18 and the dynamometer 64 to one degree of freedom.

A diaphragm seal 80 including a flexible diaphragm and piston are mounted on a ring 82 on the top of the housing 66 above the dynamometer 64. The diaphragm seal 80 serves as a seal for the pressure housing 24, and the diaphragm is preferably of a rubber impregnated fabric capable of withstanding high pressures. A rod 84 extending downward from the cross head 60 operably connects the oscillator 56 to the dynamometer 64 through the diaphragm seal 80.

Figure 2:
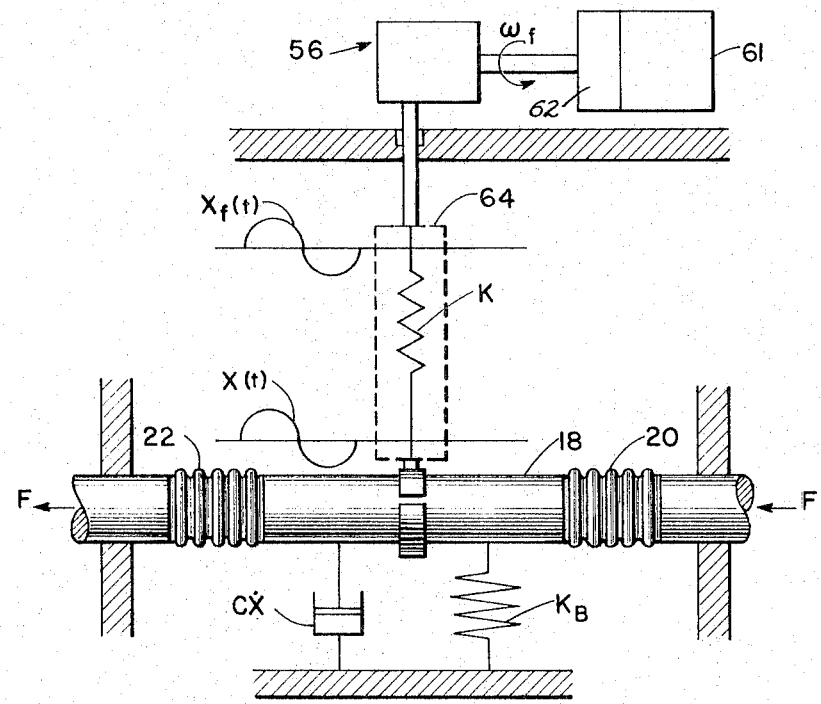
FIG. 2 is a diagrammatic view illustrating the dynamic equivalent of the apparatus shown in FIG. 1.

Referring now to FIG. 2, there is illustrated schematically the system employed in measuring fluid densities according to the present invention. The basic principle upon which the method and apparatus of the invention operates is that the mass of any vibrating system is a primary factor in determining the dynamic characteristics of the system. Thus, if the fluid flowing through the system measurably affects the vibrating mass, a means of measuring fluid density is provided.

More particularly, the flow passage 18, which is supported by the bellows 20 and 22 having a transverse spring constant $k_B$, is driven with a sinusoidal motion ($x_0 \sin \omega_f t$) by the oscillator 56 through the dynamometer having a spring stiffness $k$. The vertical motion of the flow passage 18 is $x(t)$. The effective damping force, assumed to be viscous, is designated by $c\dot{x}(t)$. Assuming the fluid in the passage behaves as a rigid body, the acceleration reaction of the mass is $M\ddot{x}(t)$ where M is the total vibrating mass of the system ($M = m + pV$) and $m$ is the tare mass, V is the volume of the fluid affected by the motion of the passage, and $p$ is the density of the fluid. The resulting equation of motion is $$M\ddot{x}(t) + C\dot{x}(t) + (k + k_B)x(t) = kx_0 \sin \omega_f t$$

One form of the solution of this equation is $$x(t) = \frac{x_0 \cos \alpha}{[1 + k_B/k - M\mu_f^2/k]} \sin(\omega_f t - \alpha)$$

where the angle $\alpha$ is the phase angle between the motion of the passage and is governed by the equation:

$$\alpha = \tan^{-1}\left\{2\left(\frac{\omega_f}{\omega_n}\right)\left(\frac{c}{c_o}\right) \bigg/ 1 - \left(\frac{\omega_f}{\omega_n}\right)^2\right\}$$

In order that the dynamometer output be a linear function of density, it is necessary that $\alpha$ be negligibly small, and by employing a stiff dynamometer ($k \gg M\omega_f^2$), frequency ratios ($\omega_f/\omega_n$) on the order of $1/2000$ can be readily obtained. This is sufficient for a subcritically damped system ($c/c_o < 1$) to cause an inphase motion between the driver and the passage. Assuming that the terms mentioned are negligible, the above equation reduces to $$x(t) = \left[\frac{x_0}{1 + (k_B/k)}\right] \sin \omega_f t$$

The amplitude of the vibrated passage 18 will differ from that of the oscillator 64 by an amount determined from the ratio $k_B/k$. Because the sensitivity of the instrument is directly proportional to the amplitude of the passage, it is desirable that the amplitude be maximum; therefore, a design criterion is $k \gg k_B$.

From the above equation, the maximum force exerted on the dynamometer is $$F_{max} = k_B x_0 - x_0 M \omega_f^2$$

and solving this equation explicitly for density produces $p = a + bF_{max}$, where $a$ and $b$ are constants defined by $$a = (k_B - m\omega_f^2)/(V\omega_f^2), \quad b = -1/(x_0 V \omega_f^2)$$

In operation, a fluid flowing in the pipe 10 is conducted through the densitometer 12 from the coupling 14 to the coupling 16. As this fluid flows through the movable conduit 18, it is vibrated by the oscillator 56, and the dynamometer 64 senses the force exerted by the passage 18. This force generates an electrical signal ($E_{ac}$) in phase with this motion and proportional to the maximum force. More particularly, $$E_{ac} \sim F_{max} \sin \omega_f t$$

Figure 3:
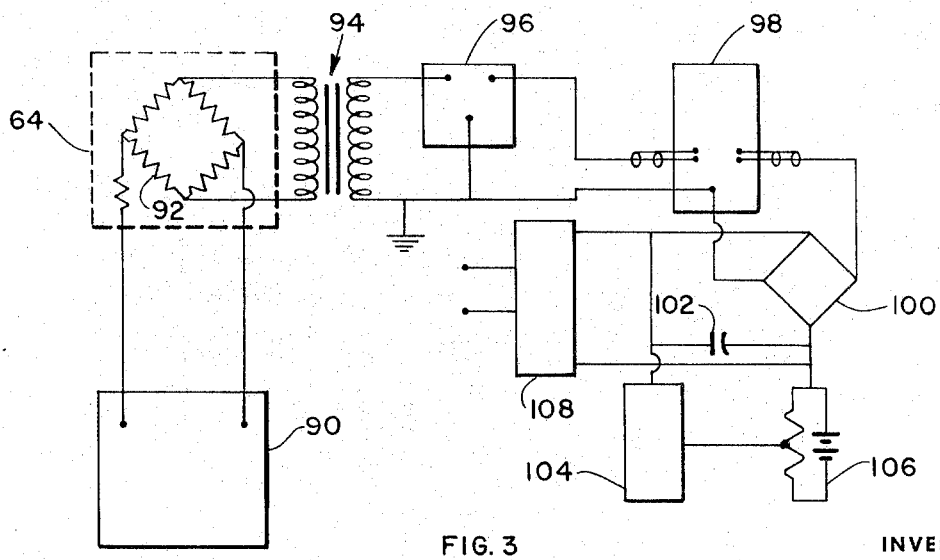
FIG. 3 is a diagram showing the electronic circuitry utilized in the present invention.

This electrical signal is rectified by the circuitry shown in FIG. 3 to provide a resulting signal ($E_{dc}$) that is proportional to the maximum force ($F_{max}$). The final relation of fluid density takes the form $p = a + b'E_{dc}$ where $a$ and $b'$ are constants that are determined experimentally.

Referring now to FIG. 3, a source 90 of constant voltage supplies direct current power, such 10 volts, to a bridge 92 of the dynamometer 64. The previously described electrical signal ($E_{ac}$) from the dynamometer 64 passes through an isolation transformer 94 to a band pass filter 96. By way of example a 12 c.p.s. millivolt level signal from the dynamometer is first filtered by a filter designed to pass frequencies in the 11–13 c.p.s. range.

The signal is then amplified by a factor of several hundred by a D.C. amplifier 98 whereupon it is rectified by a full wave rectifier 100. The resulting signal ($E_{dc}$) is refiltered by a filter 102 to remove ripple and transmitted to a voltmeter readout 104 connected to a biasing network 106. Either an analog or digital voltmeter can be used as the final readout equipment. When the output from the dynamometer 64 exceeds a predetermined level, a clutch control 108 de-energizes the clutch 62 to stop the oscillator 56.

While a preferred embodiment of the apparatus of this invention has been described, various modifications may be made without departing from the spirit of the invention or the scope of the subjoined claims. For example, it is contemplated that other devices may be used in place of the oscillator 56 and dynamometer 64 for vibrating the tubing 18 at a controlled amplitude and frequency through the application of a measured force. A solenoid could be substituted for these elements, and the voltage applied to the solenoid to obtain a given amplitude would be measured to obtain a value for the force.

What is claimed is:

1. An electromechanical densitometer for measuring the density of a pressurized cryogenic fluid flowing in a pipe comprising:
    a substantially rigid chamber,
    a fluid conduit within said chamber for receiving the pressurized cryogenic fluid from the pipe,
    a pair of spaced bellows, each having one end connected to said conduit and the opposite end connected to said chamber,
    means for pressurizing said chamber to the pressure of the flowing cryogenic fluid to eliminate pressure sensitivity of said bellows, a vacuum jacket surrounding said chamber for thermally insulating the same,
a pair of couplings secured to the pipe containing the cryogenic fluid at spaced points on opposite sides of said chamber,
a transfer line secured to each of said couplings extending into said vacuum jacket to said chamber, each of said transfer lines comprising,
an outer casing having one end rigidly secured to one of said couplings and the other end secured to said chamber, and
an inner casing having one end rigidly secured to said coupling and the other end secured to said chamber,
a mechanical oscillator for generating a sinusoidal motion,
means for connecting said oscillator to said conduit for vibrating the same in said chamber transversely in a single plane at a controlled amplitude and frequency,
a dynamometer for sensing the force exerted by the vibrating conduit and cryogenic fluid flowing therein and generating an electrical signal in phase with said vibrating conduit, said signal being proportional to the maximum force exerted by said conduit, and
means for monitoring said electrical signal.

2. Apparatus as claimed in claim 1, wherein said means for monitoring the electrical signal includes
a bridge operably connected to dynamometer,
a constant voltage power supply connected to said bridge,
a transformer connected to said bridge for receiving said signal,
a filter connected to said transformer, and
an amplifier connected to said filter.

3. Apparatus as claimed in claim 2, including
a full wave rectifier connected to said amplifier,
a filter connected to said rectifier, and
a voltmeter connected to said filter.

4. Means for metering the density of fluid flowing in a line having a constant inside diameter, including
a pair of spaced couplings in a portion of the line arranged in coaxial and axially spaced relation,
a closed chamber positioned between said couplings,
a pair of transfer lines rigidly secured to said spaced couplings and extending into opposite ends of said closed chamber, the inside diameter of said transfer line being substantially equal thereby providing rigid inlet and outlet ports of equal size at opposite ends of said closed chamber,
a conduit in said chamber having a straight bore with an upstream end adjacent the inlet port and a downstream end adjacent the outlet port thereby providing a continuous passage for the fluid flowing in the line between the ports,
means for vibrating said conduit in transverse relation to the line of flow at a large amplitude and low frequency with the downstream end of the conduit moving differentially with respect to the outlet port,
means for measuring the force exerted by the vibrated conduit and the fluid therein, and
means responsive to said force for providing a measure of the density of the flowing fluid.

References Cited by the Examiner

UNITED STATES PATENTS

| 2,635,462 | 4/1953 | Poole et al. | 73—32 |
| 2,943,476 | 7/1960 | Bernstein | 73—32 |
| 3,080,750 | 3/1963 | Wiley et al. | 73—194 |
| 3,138,955 | 6/1964 | Uttley | 73—32 X |
| 3,218,851 | 11/1965 | Sipin | 73—32 X |

DAVID SCHONBERG, *Primary Examiner.*